(12) United States Patent
Borthwick et al.

(10) Patent No.: US 7,512,225 B2
(45) Date of Patent: Mar. 31, 2009

(54) COMPUTER-TELEPHONY INTEGRATION

(75) Inventors: David J Borthwick, Ipswich (GB); Jonathan D Curtis, Ipswich (GB)

(73) Assignee: British Telecommunications PLC, London (GB)

( * ) Notice: Subject to any disclaimer, the term of this patent is extended or adjusted under 35 U.S.C. 154(b) by 352 days.

(21) Appl. No.: 10/594,669

(22) PCT Filed: Apr. 20, 2005

(86) PCT No.: PCT/GB2005/001511

§ 371 (c)(1), (2), (4) Date: Sep. 28, 2006

(87) PCT Pub. No.: WO2005/104481

PCT Pub. Date: Nov. 3, 2005

(65) Prior Publication Data

US 2008/0232350 A1    Sep. 25, 2008

(30) Foreign Application Priority Data

Apr. 23, 2004    (GB) .................................. 0409092.4

(51) Int. Cl.
H04M 3/42    (2006.01)

(52) U.S. Cl. ............................. 379/221.09; 379/221.12; 379/88.17; 379/265.09; 379/205.01

(58) Field of Classification Search ............ 379/221.09, 379/221.12, 221.08, 202.01, 204.01, 88.17, 379/265.09, 205.01
See application file for complete search history.

(56) References Cited

U.S. PATENT DOCUMENTS

| | | | | |
|---|---|---|---|---|
| 5,884,032 A | * | 3/1999 | Bateman et al. ............. | 709/204 |
| 6,463,149 B1 | * | 10/2002 | Jolissaint et al. ........ | 379/265.09 |
| 7,039,170 B1 | * | 5/2006 | Sylvain .................... | 379/93.23 |
| 7,050,557 B2 | * | 5/2006 | Creamer et al. ......... | 379/205.01 |
| 7,095,840 B2 | * | 8/2006 | Dezonno et al. ........ | 379/265.09 |
| 2002/0054671 A1 | | 5/2002 | Wiener et al. | |
| 2002/0122542 A1 | | 9/2002 | Lew et al. | |
| 2003/0099341 A1 | * | 5/2003 | Williams ................ | 379/211.02 |
| 2004/0105536 A1 | * | 6/2004 | Williams ................ | 379/211.02 |
| 2005/0249198 A1 | * | 11/2005 | Goldman et al. ............ | 370/352 |

OTHER PUBLICATIONS

GB Search Report dated Sep. 20, 2004.
International Search Report dated Jul. 29, 2005.
Stretch, "The Parlay API—Allowing third Part Application Providers Safe and Secure Access to Network Capabilities", BT Technology Journal, BT Laboratories, GB., vol. 21, No. 3, Jul. 2003, pp. 141-159, XP001171237.
"Mapping INAP to the API For Access to Third Service Applications; SPAN-EN SPAN3 0-3070 Part 2", ETSI Standards, European Telecommunications Standards Institute, Sophia-Antipo, FR, Jan. 1, 1900, XP014019628.
Lozinski, "Parlay/OSA—A New Way to Create Wireless Services", ZA Lozinski, IBM, submitted to "IEC Mobile Wireless Data", May 15, 2003, revised Jun. 1, 2003.
<ParlayAPI.pdf>.

* cited by examiner

Primary Examiner—Olisa Anwah
(74) Attorney, Agent, or Firm—Nixon & Vanderhye PC

(57) ABSTRACT

The invention provides a modification to the operation of the intelligent network instruction set whereby on transmitting an Initiate Call Attempt message between the SCP 7 and an SSP 4 an instruction is included which forces the SSP 4 to send a response message whereby the identity assigned to the actions requested is known to the SCP 7 prior to the occurrence of a BCSM event at the SSP.

18 Claims, 3 Drawing Sheets

COMPUTER-TELEPHONY INTEGRATION

This application is the US national phase of international application PCT/GB2005/001511 filed 20 Apr. 2005 which designated the U.S. and claims benefit of GB 0409092.4, dated 23 Apr. 2004, the entire content of which is hereby incorporated by reference.

The present invention relates to computer—telephony integration and in particular to a method and networks for improving the handling of telephone calls in the public switched telephone network (PSTN) when such calls arise from a computer network.

The "Parlay" collaboration between a number of telephone and computer network providers resulted in the development of an interface to enhance the capability of the internet, in particular by allowing "click to dial" facilities. Thus a user of a web browser (for example "Netscape" or "Windows Explorer" could view a service provider's web page and be presented with a clickable icon to contact a specified telephone. The user's computer being associated with a PSTN telephone number allows a message to be sent through the internet to an application server which interfaces with a service control point (SCP) of the PSTN and transmits the user's telephone number (the "A" party number) and a number derived from the service providers clickable icon (the "B" party number).

The application server provides protocol translation between the TCP/IP used by the internet and the signalling system of the SCP. A basic explanation of Parlay APIs (Application Protocol Interfaces) can be found at:

http://parlay.org/docs/04b_Parlay_Overview_Flyer_Final_Protected.pdf

Therefore it is known to provide an application protocol interface which allows a web page designer to incorporate clickable connect call buttons into the web page without concern as to the inter-operability of the internet (world wide web) with the fixed telecommunications network.

When a click to connect button is selected the gateway transmits to the SCP the user information mentioned above which is used by the SCP to transmit instructions to a Service Switching Point (SSP) an instruction to connect the A party telephone in the local loop and to cause ringing signals to be applied to that phone. When the A party answers the SSP sends a message to the SCP confirming the A party answer which enables the SCP to instruct the ringing of the B party telephone which may be done at the same SSP or at a remote SSP. On B party answer the connection is established through the network so that full communication is established through the PSTN between the A party telephone and the B party telephone.

A problem arises in certain circumstances once the SCP has sent the first instruction to the SSP primarily because the signalling protocol does not allow the SCP to know the transaction identity assigned by the SSP to the call set up process unless or until an "event" associated with the call set up process occurs. Thus, in the SCP a transaction identity is assigned to the instruction to commence ringing of the A party telephone. This transaction identity is used by the SCP throughout the establishment and monitoring of the call and messages between the SCP and the SSPs always include the transaction identity as an originators identification or "OID". Return messages from the SSPs will have a different OID being the transaction identity associated with the call by the SSP and a "DID" or destination identity which equates with the OID assigned by the SCP.

Subsequent messages sent from the SCP to the SSP can then contain a DID equivalent to the OID assigned by the SSP which enables the SSP to be instructed to do something in relation to the call set up. Specific instruction to do something in connection with the call cannot be delivered until an OID assigned by the SSP becomes know to the SCP for use as a DID.

Once the SCP has instructed the initial call set up, until either the A party answers or a timeout on ringing occurs there is nothing for the SSP to report so instructions in relation to the call cannot be sent until one of those two events occurs. Consequently, if the user wishes to modify the call set up (for example by clicking on an alternative icon in the computer display) while the Parlay API may forward the change instruction message to the SCP the SCP is unable to act upon the revised request and must either queue the request until an event report from the SSP or, as is more likely, will ignore the request.

According to the present invention there is provided a telecommunications network including at least one service control point and a plurality of interconnected service switching points, said service control point being responsive to signals received from a gateway to another network to cause a call to be set up between two or more termination points of the telecommunications network, the service control point sending a first instruction message to one of the service switching points to cause a connection to a first of said two or more termination points characterised in that the service control point sends a further instruction embedded in the message to the same service switching point, said further instruction forcing a response from that service switching point whereby an identity assigned by the service switching point to action embedded in the first instruction message is captured by the service control point whereby further instruction signals received from the gateway prior to receipt by the service control point of an event message from the service switching point can be used by the service control point to send a modifying instruction message to the service switching point.

Preferably the gateway is present on a connectionless network and interfaces between the connectionless network and the telecommunications network to transfer instructions from a computer terminal of the connectionless network thus enabling a call connection in the telecommunications network to be originated by the computer terminal.

The first instruction received by the service control point may include the identity of two termination points of the telecommunications network, a first of which is associated with the originating computer terminal and the other of which is derived from a page of information being viewed on the computer terminal.

The first instruction transmitted by the service control point may be to cause a ringing instruction to be transmitted to the first termination point and the second instruction may request charging information to be returned. Alternatively the second instruction may contain invalid instruction to the service switching point to cause the return of an associated query message.

The subsequent instruction received from the gateway may be a cancellation instruction whereby the service control point may transmit an abort message to the service switching point to effect cancellation of the call in progress.

The connectionless network may be an intranet or internet, the gateway being responsible for converting protocol between the connectionless network and the connection oriented network, the connection oriented network being the PSTN.

A computer-telephony integration (CTI) system including a telecommunications network in accordance with the invention will now be described by way of example only with reference to the accompanying drawings of which:

Figure 1:
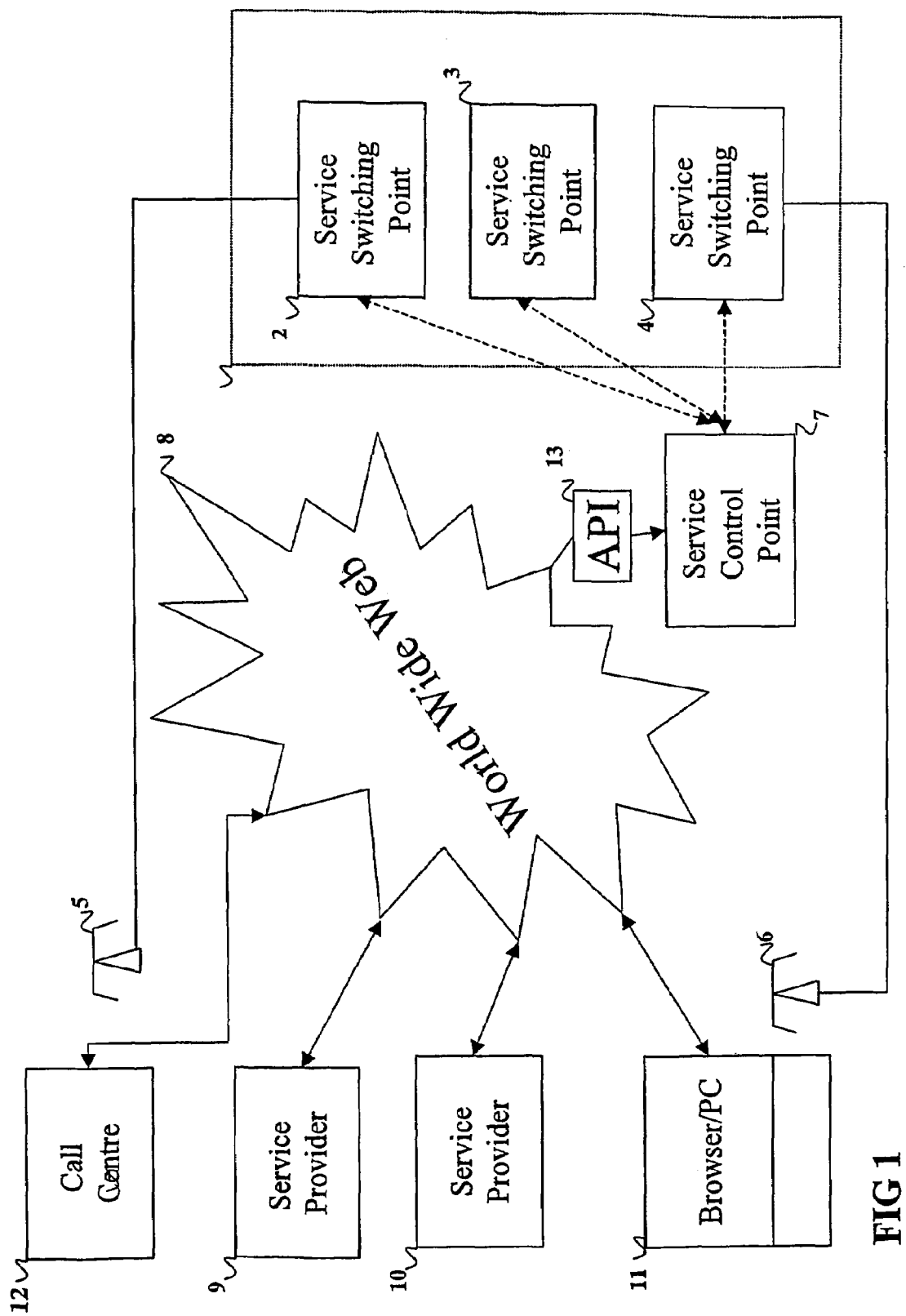
FIG. 1 is a block schematic diagram of the component parts of the CTI system.

Referring to FIG. 1, the PSTN1 is shown as comprising a plurality of SSPs 2, 3 and 4 which are fully inter-connectable and which act to establish calls between network nodes, for example, telephones 5 and 6.

The operation of an intelligent network such as the PSTN allows for basic switching to be carried out by, for example, computer control in the individual SSPs 2, 3, and 4 with reporting or querying capabilities to a SCP 7 such that, for example, where new services are introduced or more complex computational capability is required the SCP 7 can send instructions to the SSPs 2, 3, 4 to effect speciality call connections. Messaging instructions between the SCP 7 and SSP 2,3,4 are INAP messages from the ITU recommended signalling system SS7—intelligent network application part.

The world wide web (or internet) uses a different signalling protocol called TCP/IP to effect requests and data transmission between nodes of the connectionless network. Messages on the world wide web 8 use so called internet protocol to transfer addressed messages between nodes of the network. Nodes will include, for example, service providers 9 and 10 which carry accessible information for transmission by way of the world wide web for display on the screens of connected computers, for example, a connected computer at an individual establishment such as browser PC 11 or similar screens in a call centre distribution arrangement for example as shown at 12. In normal operation the user, for example, of browser PC 11 will access websites provided by service providers and will download information, graphics, video and sound for example using programmes such as Microsoft Internet Explorer or Netscape Navigator to browse through or search for information. It is possible for the user of the browser PC 11 to communicate via the world wide web 8 directly with an operator in a call centre 12 to enable the interchange of typed messages, for example.

Problems arise when there is a requirement for a different form of communication, for example, a telephonic communication between the PC user and a call centre. A page of information my include a telephone number for display on the screen of the PC 11 in which case the user may pick up the telephone 6 and dial the required number to ring the telephone 5. This service would be entirely divorced from the actual internet functionality, using solely the PSTN's normal functionality to effect connection of the call between the user's phone 6 and the call centre phone 5.

It is now fairly common practice for web pages, for example, on sites offering services for goods or from sites responsive to directory enquiry type queries from the PC to provide a clickable icon on the screen marked, for example, "click to call" or "click to connect". If a user selects the icon then the background scripting related to the screen generates a call request. Such call requests cannot go directly to the telecommunications network must pass through the internet 8 to another node present on the internet called an API (or Application Protocol Interface) 13. The API 13 operates with a sub-set of the Parlay protocol referred to as Parlay-X protocol which enables a limited number of features selected from the features available for full control of the licensed operators network. Thus on receipt on of the request to connect which will feature a number for the user's telephone 6 derived from, for example, a cookie held on the user PC 11 and the number of the telephone 5. The API 13 on receipt of the request will forward a converted instruction to the SCP 7 which can then set up the call.

If the user of the PC 11 now determines that the call should not be made at the present time and clicks the cancellation button this too will generate a cancellation message or abort message transmitted by the PC 11 through the internet 8 to the API 13. The API 13 will in turn forward the abort message to the SCP 7.

Figure 2:
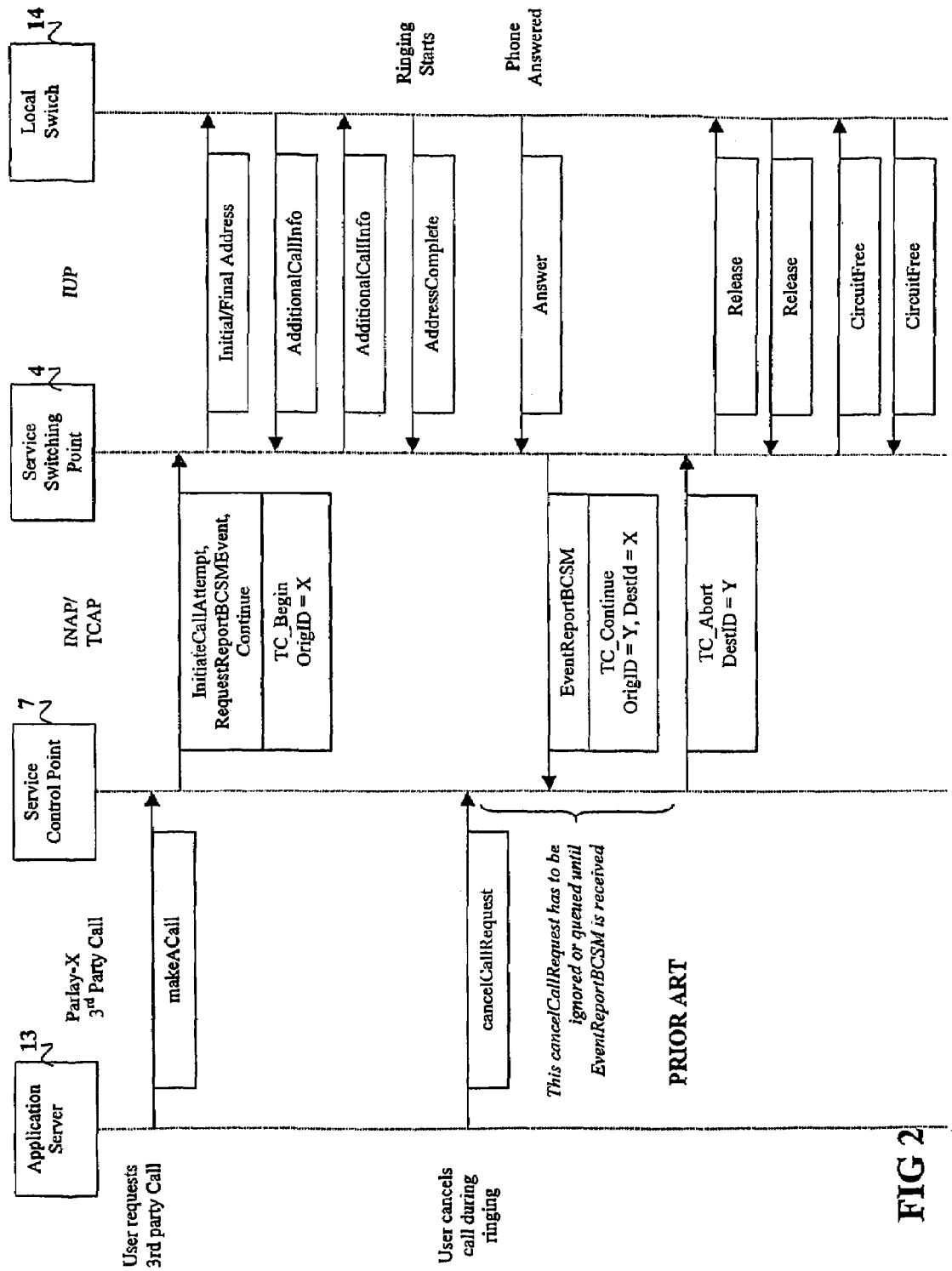
FIG. 2 is a signal flow diagram of the CTI system of FIG. 1 prior to implementation of the invention.

The process for establishing a call is shown in FIG. 2 in which signalling between the API 13, SCP 7, SSP 4 and the local switch 14 to which the user phone 6 is connected in the network are shown. As shown in FIG. 2 the protocol used between the API and SCP is a Parlay-X protocol, INAP/TCAP being used between the SCP 7 and SSP 4 and an IUP protocol being used between the SSP and the local switches to which it is connected. Thus, when a user requests a third party call via the world wide web 8 (not shown) the API 13 transmits a make a call instruction to the SCP 7. The SCP in response to the instruction sends an initiate call attempt (ICA) message to the SSP which includes a request for a report of any basic call state model (BCSM) event and is flagged with a TC begin and a unique originator ID, a numerical identifier of the process now being started at the SCP 7.

On receipt of the initiate call attempt instruction the SSP 4 forwards an initial final address message (IFAM) to the local switch to which telephone 6 is connected so that the local switch sets up a call to the that telephone. Several messages may be interchanged between the SSP 4 and the local switch 14 to enable completion of the connection at the local switch, the local switch calling for additional call information and receiving that call information from the SSP4 until a complete node address for the telephone 6 has been received. Once the complete address has been received by the local switch 14 telephone 6 will have a ringing current applied and the local switch will forward an address complete message to the SSP4.

While the information exchange and ringing continues between the SSP 4, the local switch 14 and the telephone 6 the SCP 7 does not have information concerning the progress of the call since a basic call state model event has not occurred so that there is no report back from the SSP 4 to the SCP 7.

Thus if the user of the PC 11 now forwards a cancellation request before or during the ringing phase, the API 13 will forward that request to the SCP7. The SCP 7 cannot however identify the call in progress to the SSP 4 to allow an abort to be performed in advance of the telephone 6 being answered. Once the telephone 6 is answered then the local switch 14 detects the answer condition and transmits the IUP message answer back to the SSP 4 which now forwards an event report of the basic call state model type to indicate that the answer condition has been met. The message here is flagged with a continue and an originating ID from the SSP 4 which in itself is unique to the call currently in progress. The destination ID of the original ICA message is also included in the flag to identify the message to the SCP 7. The SCP 7 is now able to forward a TC abort message with the appropriate destination ID (the same as the originating ID of the SSP 4) which enables the SSP 4 to forward a release to the local switch 14 which in turn responds with a release message. Finally, the SSP 4 instructs the local switch 14 to free the circuit and receives a circuit free response from the local switch 14.

Thus as indicated where normal progress of a call originated in the network is handled by way of the SCP 7 the cancel call request message to the API 13 from the user PC 11 does not function and the only way in which a user can abort a call is by first answering the telephone 6. As indicated however the call set up will time out once ringing has started at the local switch this is likely to be by default setting within the local switch which could allow ringing for as long as six minutes before timing out. For the avoidance of doubt it is noted that the ringing default can be shortened when the request report of basic call state model event is transmitted from the SCP to the SSP.

Figure 3:
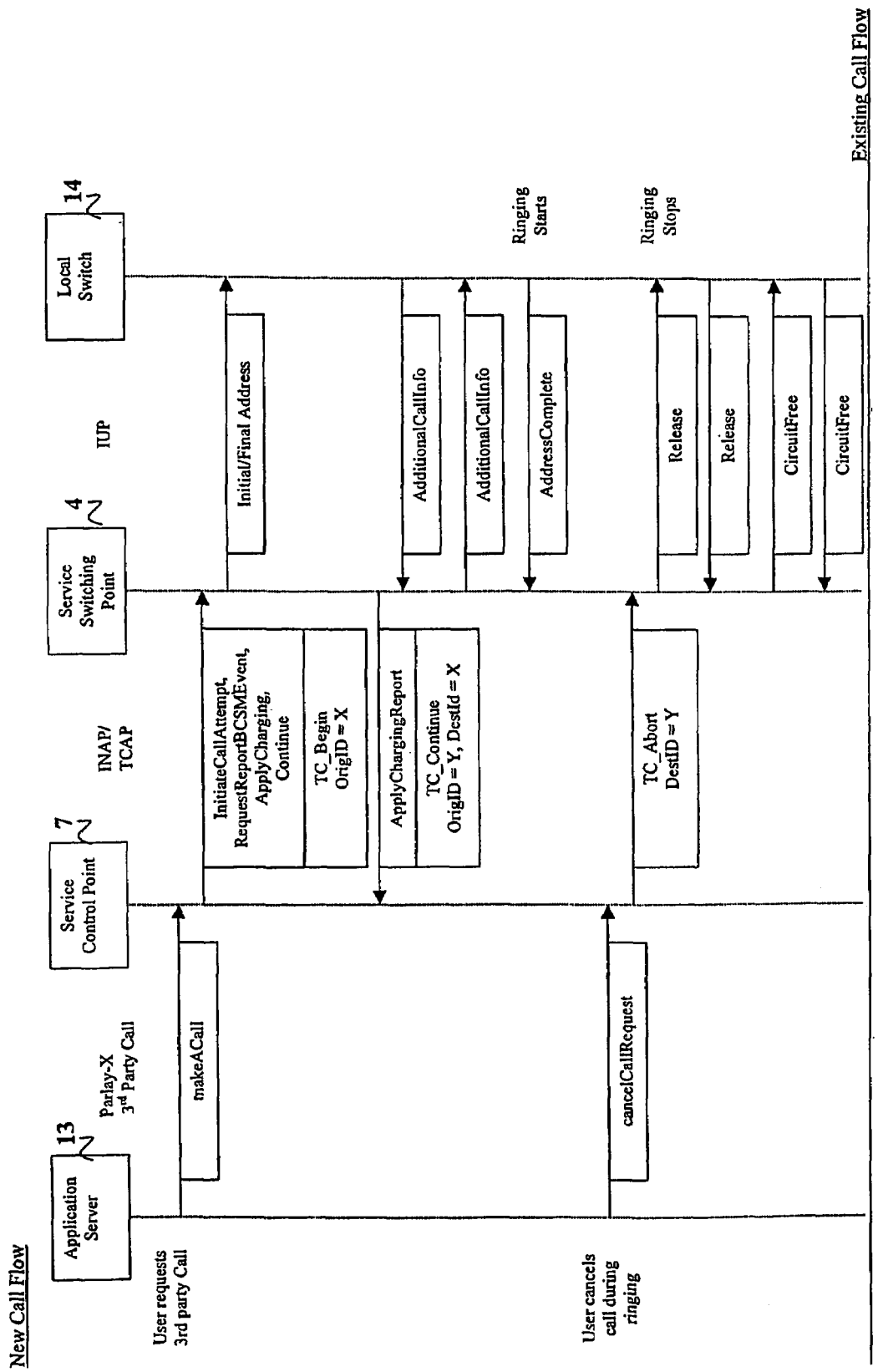
FIG. 3 is a signal flow diagram of the CTI system of FIG. 1 after implementation of the invention.

Turning now to FIG. 3, the basic set up of the call is substantially similar with the exception of the first instruction between SCP 7 and the SSP 4. In this case after the initiate call attempt with a request report of basic call state model event the SCP 7 instructs the SSP 4 to apply charging. Although this will not result in any charges being applied in respect of the message it will result in an applied charging report to be returned to the SCP 7 this being flagged with the continue and originator ID flags. Thus whilst the SSP 4 continues to provide additional call information to the local switch on request until it receives the address complete instruction when the local switch 14 commences ringing at the telephone 6, as soon as a user cancel (or any other relevant message for example for connection to an alternative node of the PSTN) is received at the API 13 the cancel call request can be acted upon by the SCP 7 since it now has a required originating ID from the SSP 4 to enable an abort message to be transmitted from the SCP 7 to the SSP 4. On receipt of the abort message the SSP 4 can now force release by transmitting a release message to the local switch 14 which will cancel ringing of the telephone 6 and return a release message to the SSP 4 which then frees the circuit as previously noted.

Although specifically the indication is that the apply charging instruction can be used to force return of an originating ID by the SSP 4, it should be noted that the specific message is shown as an example only. Other messages between the SCP and SSP can be placed with the initiate call attempt instruction provided that they cause a response from the SSP 4. One example is a message including an invalid component but this is not a preferred option. Invalid data in the ICA message will result in a query message being returned from the SSP 4 to the SCP 7.

The invention claimed is:

1. A telecommunications network including at least one service control point and a plurality of interconnected service switching points, in which said service control point is arranged in use to respond to signals received from a gateway to another network to cause a call to be set up between two or more termination points of the telecommunications network, in which the service control point is arranged in use to send a message including a first instruction to one of the service switching points to cause a connection to a first of said two or more termination points characterised in that the service control point is arranged in use to send a second instruction embedded in the message to the same service switching point, in which said second instruction is arranged to force the service switching point to respond with a message to the service control point with an identity assigned by the service switching point to the action requested in the first instruction in which the service control point is arranged in use to receive further instruction signals from the gateway prior to receipt by the service control point of an event message from the service switching point in which the service control point is arranged, in use, to use the further instruction signals to send a modifying instruction message to the service switching point.

2. A telecommunications network as claimed in claim 1 in which the gateway is present on a connectionless network and comprises an interface between the connectionless network and the telecommunications network to transfer instructions from a computer terminal of the connectionless network thus enabling a call connection in the telecommunications network to be originated by the computer terminal.

3. A telecommunications network as claimed in claim 1 in which the first instruction received by the service control point includes the identity of two termination points of the telecommunications network, a first of which is associated with the originating computer terminal and the other of which is derived from a page of information being viewed on the computer terminal.

4. A telecommunications network as claimed in claim 1 in which the first instruction transmitted by the service control point causes a ringing instruction to be transmitted to the first termination point.

5. A telecommunications network as claimed in claim 1 in which the second instruction requests charging information to be returned.

6. A telecommunications network as claimed in claim 1 in which the second instruction contains an invalid instruction to the service switching point to cause the return of an associated query message.

7. A telecommunications network as claimed in claim 1 in which the subsequent instruction received from the gateway is a cancellation instruction which causes the service control point to transmit an abort message to the service switching point to effect cancellation of the call in progress.

8. A telecommunications network as claimed in claim 2 in which the connectionless network is an intranet or the internet, the gateway being responsible for converting protocol between the connectionless network and the telecommunications network.

9. A telecommunications network as claimed in claim 1 comprising a connection oriented network.

10. A method of operation of a telecommunications network including at least one service control point and a plurality of interconnected service switching points, the method including the steps of said service control point responding to signals received from a gateway to another network to cause a call to be set up between two or more termination points of the telecommunications network, the service control point sending a message inducing a first instruction to one of the service switching points to cause a connection to a first of said two or more termination points characterised in that the service control point sends a second instruction embedded in the message to the same service switching point, said second instruction forcing a response from that service switching point in which an identity assigned by the service switching point to the action requested in the first instruction is passed by the service switching point to the service control point and in which on receipt of further instruction signals from the gateway prior to receipt by the service control point of an event message from the service switching point, the service control point is able to send a modifying instruction message to the service switching point.

11. A method as claimed in claim 10 in which the gateway is present on a connectionless network and interfaces between the connectionless network and the telecommunications network to transfer instructions from a computer terminal of the connectionless network thus enabling a call connection in the telecommunications network to be originated by the computer terminal.

12. A method as claimed in claim 10 in which the first instruction received by the service control point includes the identity of two termination points of the telecommunications network, a first of which is associated with the originating computer terminal and the other of which is derived from a page of information being viewed on the computer terminal.

13. A method as claimed in claim 10 in which the first instruction transmitted by the service control point causes a ringing instruction to be transmitted to the first termination point.

14. A method as claimed in claim 10 in which the second instruction requests charging information to be returned.

15. A method as claimed in claim 10 in which the second instruction contains an invalid instruction to the service switching point to cause the return of an associated query message.

16. A method as claimed in claim 10 in which the subsequent instruction received from the gateway is a cancellation instruction which causes the service control point to transmit an abort message to the service switching point to effect cancellation of the call in progress.

17. A method as claimed in claim 10 in which the connectionless network is an intranet or the internet, the gateway being responsible for converting protocol between the connectionless network and the telecommunications network.

18. A method as claimed in claim 17 in which the telecommunications network comprises a connection oriented network.

* * * * *